United States Patent
Choi

(10) Patent No.: US 6,596,205 B1
(45) Date of Patent: Jul. 22, 2003

(54) ARRANGEMENT FOR FORMING A LAYERED FIBROUS MAT OF VARIED POROSITY

(75) Inventor: Kyung-Ju Choi, County of Jefferson, KY (US)

(73) Assignee: AAF-McQuay, Louisville, KY (US)

( * ) Notice: Subject to any disclaimer, the term of this patent is extended or adjusted under 35 U.S.C. 154(b) by 524 days.

(21) Appl. No.: 09/635,310

(22) Filed: Aug. 9, 2000

(51) Int. Cl.[7] .................................................. B27N 3/04
(52) U.S. Cl. ........................................... 264/6; 264/115
(58) Field of Search ................................ 264/115, 113, 264/6, 518; 425/72.2

(56) References Cited

U.S. PATENT DOCUMENTS

| | | | |
|---|---|---|---|
| 4,095,312 A | 6/1978 | Haley | 19/308 |
| 4,100,324 A | 7/1978 | Anderson et al. | 428/288 |
| 4,267,002 A | 5/1981 | Sloan et al. | 156/276 |
| 4,375,446 A | 3/1983 | Fujii et al. | 264/518 |
| 4,526,733 A | 7/1985 | Lau | 264/12 |
| 5,725,812 A | 3/1998 | Choi | 264/6 |
| 5,891,482 A | 4/1999 | Choi | 425/72.2 |
| 5,976,209 A | 11/1999 | Choi | 55/482 |
| 5,976,427 A | 11/1999 | Choi | 264/3 |

*Primary Examiner*—Mary Lynn Theisen
(74) *Attorney, Agent, or Firm*—Polster, Lieder, Woodruff & Lucchesi

(57) ABSTRACT

An arrangement for producing a fibrous mat from a heated die source wherein the produced mat includes a first layered, preselected fiber portion of substantially straight fibers produced by directing such fibers directly to a collector source and a second layered preselected fiber portion of substantially curled fibers produced by diverting and exerting an external vortically creative curling force thereon before reaching the collector source.

22 Claims, 4 Drawing Sheets

ARRANGEMENT FOR FORMING A LAYERED FIBROUS MAT OF VARIED POROSITY

BACKGROUND OF THE INVENTION

The present invention relates to a method, apparatus and product relating to fibrous mat and more particularly to a unique and novel arrangement for making fibrous mat in such a manner that the resulting spun fibrous layered mat has a controlled variable porosity. The present invention has particular applicability to polymer fibrous mat produced by melt blowing die apparatus but it is to be understood that the present invention can be readily utilized in layered mat production wherein fibrous mats of other fibrous materials in addition to preselected polymer material—such as glass—are extracted in die attenuated form from a heated die source unto a spaced collector source.

Layered fibrous mat composed of fibers attenuated from a heated die source unto a spaced layered mat collector surface are generally well known in both the glass and melt blown arts but none have utilized the unique and novel arrangement disclosed herein. Although, as above-noted, the present invention is not to be considered as limited to die spinning polymer materials from heated melt blown die sources, the unique and novel arrangement set forth herein has particular applicability in the melt blowing die spinning arrangements as disclosed in the U.S. Pat. No. 5,725,812, issued to Kyung-Ju Choi on Mar. 1, 1998; U.S. Pat. No. 5,891,482, issued to Kyung-Ju Choi on Apr. 6, 1999, U.S. Pat. No. 5,976, 209, issued to Kyung-Ju Choi on Nov. 2, 1999; and, U.S. Pat. No. 5,976,427, issued to Kyung-Ju Choi, also on Nov. 2, 1999.

The external treatment of fibers with respect to a fiber collecting source is generally well known in the production of non-woven fabrics, attention being directed to U.S. Pat. No. 4,095,312, issued to D. J. Haley on Jun. 20, 1978 wherein fibers are collected from two fiber feeding sources to a pair of moving collecting surfaces to form a nip; to U.S. Pat. No. 4,100,324, issued to R. A. Anderson, et al. on Jul. 11, 1978, wherein wood pulp fibers are added to a matrix of collected polymeric melt blown micro fibers; to U.S. Pat. No. 4,267,002, issue to C. H. Sloan on May 21, 1981, wherein fibers are formed in elongated rod shape with a heavy build-up in a central portion and a light build-up in a lip portion folded back over the central portion; to U.S. Pat. No. 4,375,466, issued to S. Fujii, et al. on Mar. 1, 1983, wherein melt blown fibers are collected in a valley-like fiber-collecting zone formed by relatively moveable and compressible porous plates which have a controlled number of pores; and, finally to U.S. Pat. No. 4,526,733, issued to J. C. Lau on Jul. 2, 1955, wherein a fluid stream of attenuated fibers is preselectively temperature treated upon exiting die tip orifices to provide improved collected web properties.

Although these above-noted patents disclose various external treatments of fiber streams attenuated from heated die sources, none teaches or suggests, either alone or in combination, the economical and straight-forward arrangement which includes the novel diversion and vortically creating force exertion of a selected portion of fiber streams to provide a selected variable porosity of the total fibrous mat as it passes to a fiber collecting source.

The present invention provides a unique and novel die attenuated fiber arrangement including a straight-forward, economical and inventively unified production method, apparatus and final layered fibrous mat product which allows for efficient and economic control of the porosity of a layered fibrous mat product which can have a selected variable density and porosity. The present invention accomplishes the unique features thereof with a minimum of apparatus parts and method steps in both manufacture and maintenance and, at the same time, allows for ready adjustment to control variable mat density and porosity in selected areas of a produced fibrous mat.

Various other features of the present invention will become obvious to one skilled in the art upon reading the disclosure set forth herein.

BRIEF SUMMARY OF THE INVENTION

More particularly the present invention provides a unique and novel method, apparatus and product arrangement in the production of die attenuated fibrous mat which can be utilized in any number of commercial environments—one of which is the fluid filtration art.

Specifically, the present invention provides a method of forming a web of fibrous media comprising: feeding fibers in attenuated multiple fibers sheet form from spaced heated die orifice sources in a feed path toward a spaced longitudinally extending collector source to be layered on the longitudinally extending collector source in successive lower and upper fiber layers; and, exerting an external vertically creating force at a selectively spaced location on at least a portion of the multiple fibers sheet in the feed path of the sheet as that portion and the remaining portion of the multiple fibers sheet approach the collector source with both portions forming on the collector source with the greatest fiber porosity of the formed layers of fibers on the longitudinally extending collector source being along those fibers of that portion of the multiple fibers sheet exposed to the external vortically creating force.

In addition, the present invention provides apparatus for manufacturing a fibrous mat comprising: spaced, heated die orifices source capable of spinning at least one attenuated multiple spaced fibers sheet; a spaced longitudinally extending collector surface adapted to eventually receive the totality of the multiple spaced fibers sheet to form a fibrous mat thereon; and a gap spaced fiber deflection or diverting apparatus positioned externally of the heated die orifices source to deflect or divert and apply a vortically creating deflecting or diverting force to a portion of the multiple spaced fibers sheet and to then combine the loosely bonded, deflected or diverted, responsive portion on the collector source with the remainder of the attenuated multiple fibers spun as at least one multiple spaced fibers sheet from the heated die source.

Further, the present invention provides a mat of fibrous media comprising at least a first portion of selected fiber diameter and at least a second portion also of selected fiber diameter, the first portion being of substantially aligned fibers of a first comparatively lower porosity and higher density spun from a die source directly to a collector source and the second portion being of substantially curled external force treated fibers of a second comparatively higher porosity and lower density than the first portion due to the external vortically creating force treatment before arriving at the same collector source to combine with the first higher density portion of the fibers in forming the fibrous mat.

It is to be understood that various changes can be made by one skilled in the art in the several parts and the several steps of the novel method and apparatus disclosed herein and in the novel fibrous mat also disclosed herein without departing from the scope or spirit of the present invention. For example, the spacing and number of dies, the spacing and type of collector surfaces utilized, the location and structure of the fiber vertically creating, force deflection arrangement and the nature of the fibrous material—each, or all, can be modified without departing from the scope or spirit of the present invention.

BRIEF DESCRIPTION OF THE DRAWINGS

Referring to the drawings which schematically disclose one advantageous embodiment of the present invention:

FIG. 4 illustrating a sloping, static, vortically creating deflector capable of feeding fibers from a heated die fiber source unto the gap-spaced collector surface; and, FIG. 5 illustrating still a further static, vortically creating, deflector or diverter arrangement gap-spaced from the collector surface with a chopped fiber feed supply source; and, FIG. 6 represents a further modified schematic illustration, disclosing an endless belt elongated collector surface spaced from a heated die fibers source and having a gap-spaced, vortically creating deflector surface such as is disclosed in FIG. 1

DETAILED DESCRIPTION OF THE DRAWINGS

Figure 1:
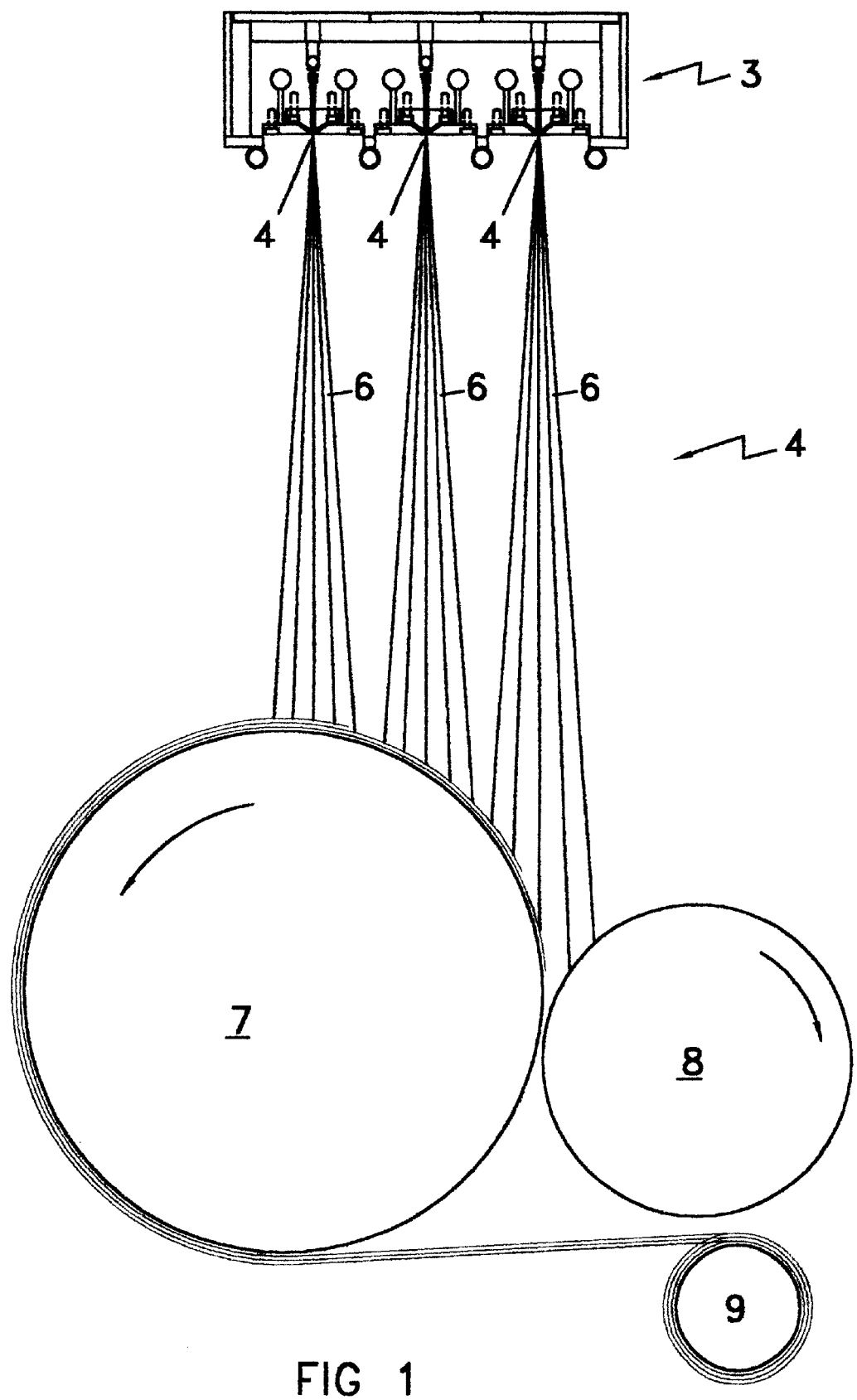
FIG. 1 is a schematic, vertical plan view of one type of heated die source employable in the present invention to attenuate multiple fiber layers to a spaced drum-like collector surface and a drum-like vortically creating force deflector surface gap spaced from the drum-like collector surface and being of smaller diameter than the drum-like collector surface and rotated in an opposite direction to apply a highly turbulent, vortically creating deflecting force to a portion of the multiple fiber layers before such vortically created deflected portion collects with the remainder of the multiple fiber layers which are fed directly to the collector surface.

Referring to FIG. 1 of the drawings, one novel overall embodiment 2 of the present invention is disclosed for forming a layered web of fibrous media in accordance with the unique arrangement as is described hereinafter. This arrangement includes a heated die source 3 having a plurality of spaced die orifices 4 capable of dispensing multiple spaced fibers layers 6 in feed paths toward a spaced longitudinally extending collector source 7. The heated die source 3 can be any one of a number of melt blown die arrangements known in the spaced fiber forming melt blown die art, such as can be found in one or more of the several patents above noted. It is to be understood that the present invention is not to be considered as limited to the melt blown heated die source disclosed herein—which is generally known for dispensing multiple spaced fiber layer 6 of polymer fibrous materials but, that other heated die arrangements such as those utilized to attenuate spaced glass fibers sheets can also be utilized. Advantageously, the die source 3 described herein can dispense polymer spaced fibers mats including several spaced rows of fibers with each row having at least approximately thirty (30) spaced fibers per approximately two point five (2.5) centimeters with each of the fiber diameters being in the range of zero point three (0.3) to twenty-five (25) microns and advantageously being approximately three point five (3.5) microns. A first portion of the multiple spaced fibers 6 are directly attenuated in straight fibers form to a moveable collector source 7, the outer peripheral surface of which is preselectively spaced from heated die source 3 a distance in the range of two point five (2.5) to one hundred fifty (150) centimeters and advantageously a distance of approximately thirty (30) centimeters. A moveable longitudinally collecting surface in the form of a rotatable drum is disclosed in FIG. 1 of the drawing with three (3) spaced multiple fiber layers 6 being attenuated from the heated melt blown die source 3 unto collector source 7. In the drawing disclosed, two of the three spaced multiple spaced fibers 6 are directly attenuated to the rotatable drum collector source 7 in straight fibers form and a portion of the third spaced multiple spaced fiber 6 on the right side of the drawing is directed to a moveable diverting and external force 8. It is to be understood that the fibers from each die row can be comparatively varied in cross-section; i.e., the fibers in one die row being comparatively fine, in an adjacent row comparatively medium, and in still a further adjacent row being comparatively course. Collector source 7 and external vertically creating deflective or diverting force 8 can be in the form of relatively parallel, spaced longitudinally extending rotatable drums 7 and 8, with drum 7 having a larger diameter than vertically creating deflecting or diverting drum 8. Drums 7 and 8 can be rotated in opposite directions by suitable drive and gearing mechanisms (not shown). The peripheral surface of longitudinally extending drum 8 can be gap-spaced from the peripheral surface of larger drum 7 in a spacing range of approximately zero point twenty-five (0.25) to fifteen (15) centimeters and advantageously a spacing of approximately zero point four eight (0.48) centimeters. Accordingly, when a preselected portion of fibers of a multiple fibers mat are diverted to smaller diameter rotating drum 8, rotating in a direction opposite the rotation of drum 7, and at a different speed than drum 8, stress is placed on such diverted fibers. This comparatively small diversion of fibers at different speeds exerts an external, vertically creating, venturi-like force on such spaced fibers causing the same to curl before returning such fibers to collector source rotating drum 7, thus, forming an upper layer of fibers on drum 7 of greater porosity than the directly attenuated fibers from heated die source 3. The total of the multiple fibers mats are then subsequently inverted and moved to a rotatable mat collecting source 9. Mat collecting source 9 can also be in the form of a substantially parallel, longitudinally extending drum rotated at a selected speed determined by the relative diameter size and speed of collector drum 7.

Figure 2:
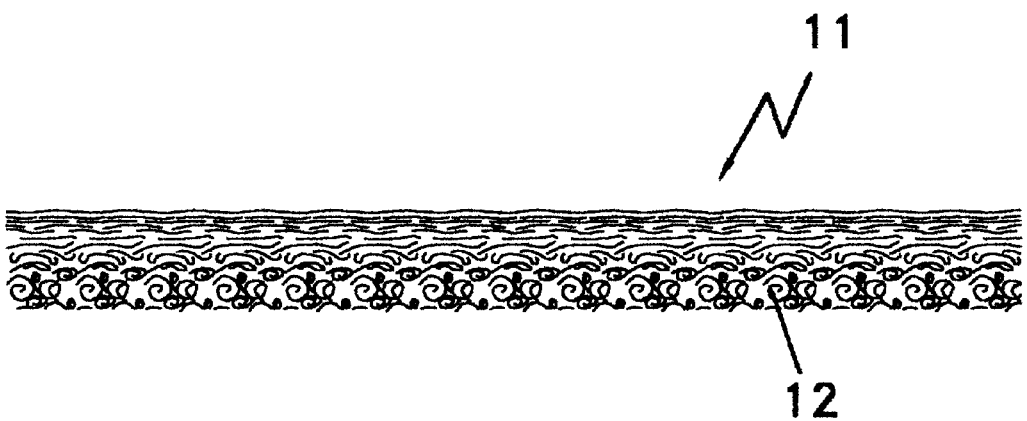
FIG. 2 is a schematic, cross-section of a portion of a novel fibrous mat produced on a novel apparatus such as disclosed in FIG. 1, this figure disclosing the low porosity, high density upper layer portion and the vortically created, curled form lower layer with higher porosity and lower density than the upper layer portion.
Figure 3:
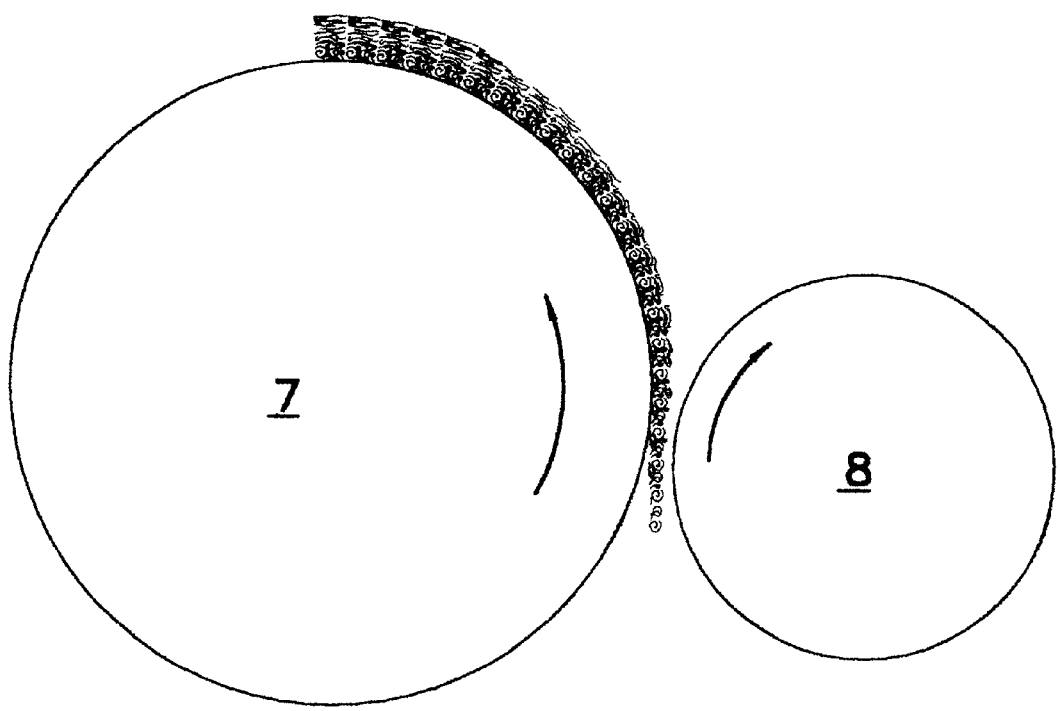
FIGS. 3–5 represent schematic illustrations of a drum-like collector surface with three types of collector surface gap spaced cooperative, vertically creating deflector arrangements—FIG. 3 being similar to the novel arrangement of FIG. 1.

Referring to FIG. 2 of the drawings, the schematic cross-section of a portion of a novel fibrous filter mat 11 removed from mat collector source 9 is disclosed. It is to be noted that the lower layers of this mat 11 are of a curled nature 12, having been subjected to the diverting and external vertically creating, venturi-like force in the form of gap-spaced, smaller diameter, longitudinally extending oppositely rotating drum 8 (FIGS. 1 and 3). Advantageously, lower layer 12, as shown, comprises approximately two thirds (⅔) of the total thickness cross-section of filter mat 11. It is to be understood that the amount of diverted, spaced fibers material and the location thereof in a mat produced in accordance with the features of the present invention can be selectively varied to meet the desired layer parameters established for a particular use thereof.

Figure 4:
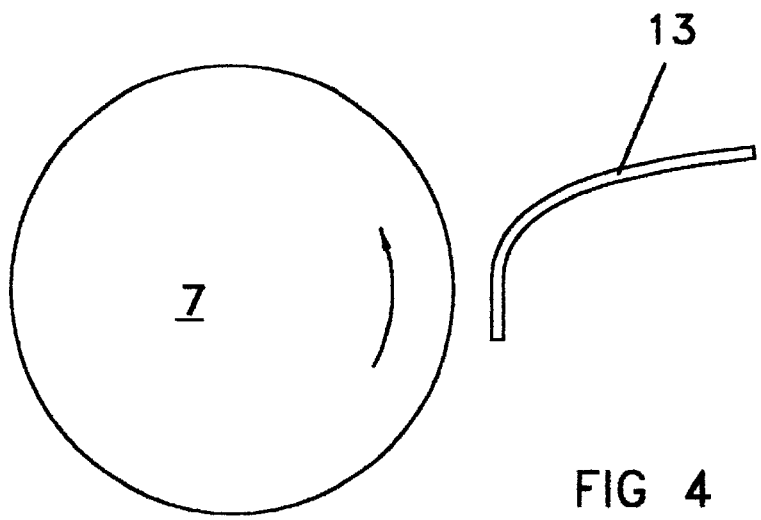
Figure 5:
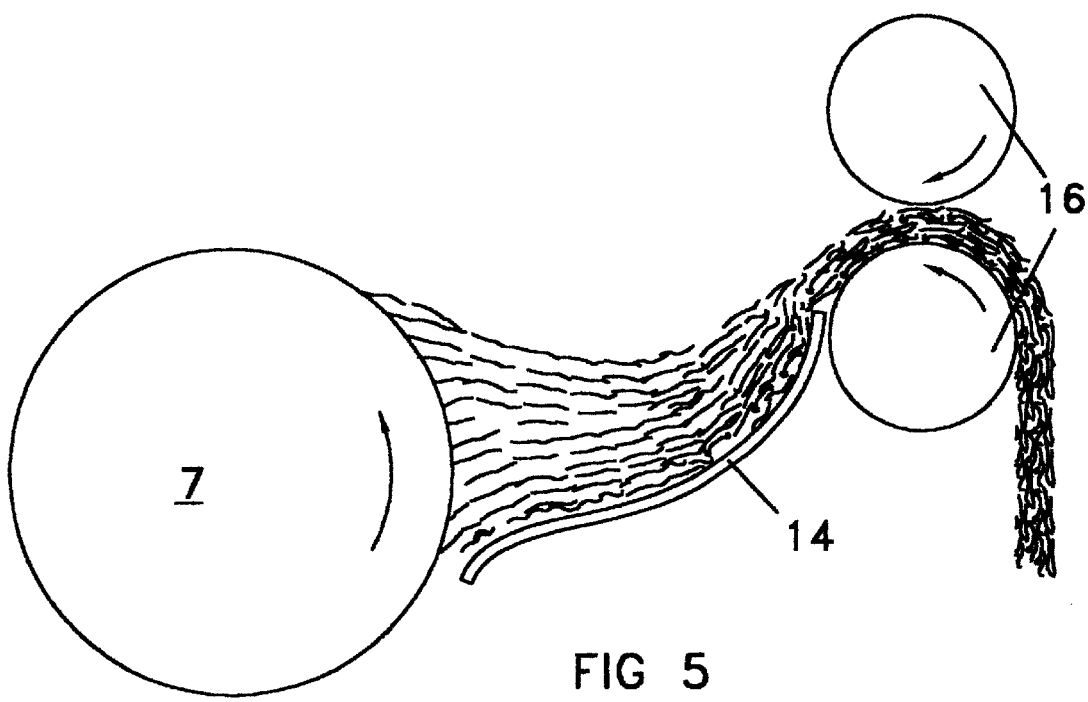

Referring to FIGS. 4 and 5, further inventive modifications of the apparatus of FIGS. 1 and 2 are illustrated. In FIG. 4, the diverting and external force is disclosed in cross-section as a sloping, static vertically creating fibers diverter 13 in gap-spaced cooperation with longitudinally extending, relatively movable collector drum 7 and, in FIG. 5, the diverting and external force is disclosed in cross-section as a sloping static, planar, vortically creating fibers diverter 14 similar to static fibers diverter 13 so as to be in gap-spaced vortically creating cooperation with longitudinally extending collector drum 7. Sloping planar diverter 14 also is shown in FIG. 5 to be in cooperation at an opposite extremity with a further fibers supply feed source 16. It is to be understood that the fibers disposed in supply feed source 16 can be of a chopped or crimp fibers nature and of the same or preselectively different fibrous material.

Figure 6:
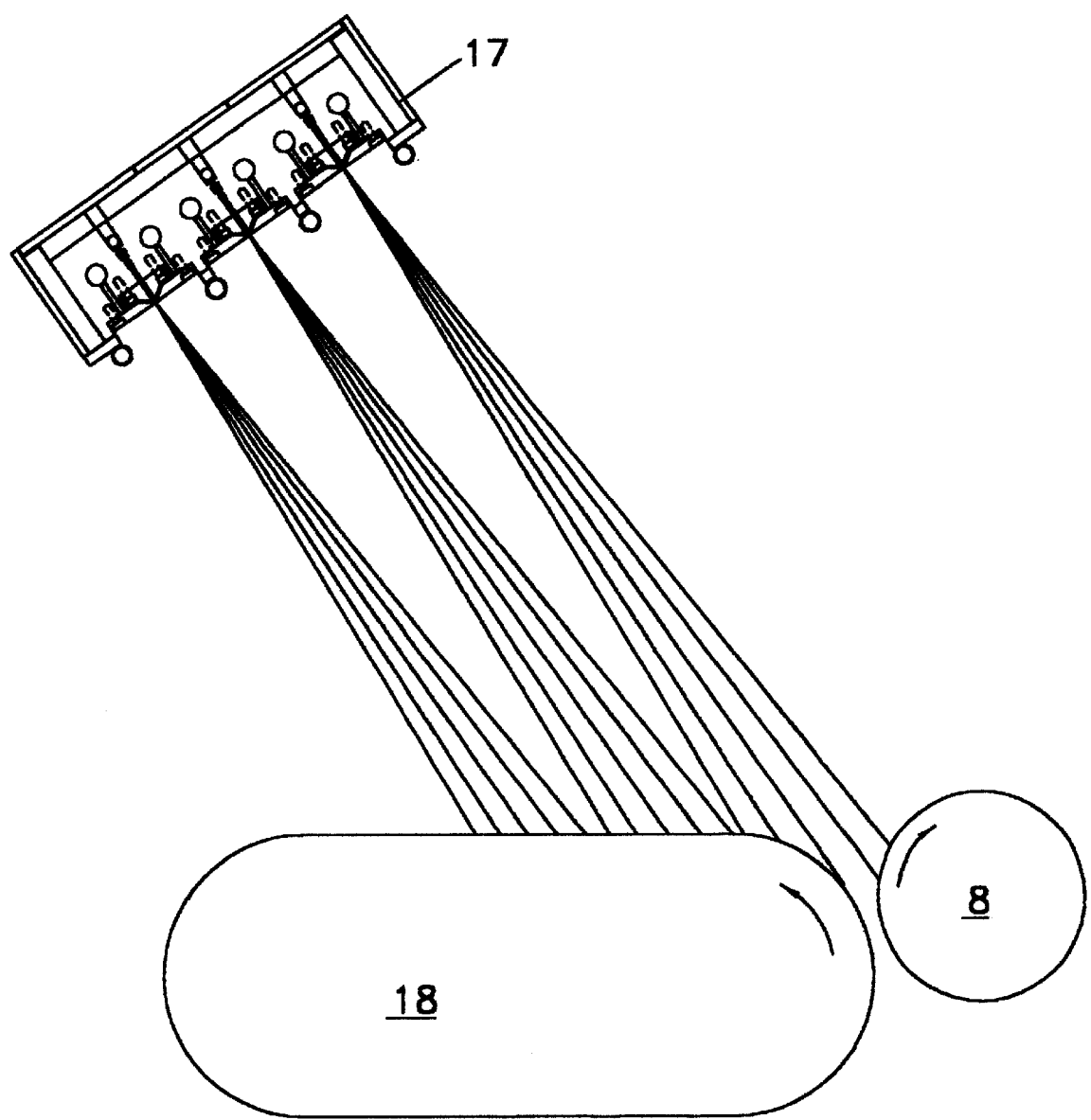

In FIG. 6, still a further embodiment of the present invention is disclosed. In this figure, heated die fibers source 17, similar to that previously described is illustrated as positioned at an inclined angle so as to direct attenuated multiple fibers sheets toward a longitudinally extending moveable endless belt 18 spaced a preselected distance from die source 17. Diverting and external vertically creating force drum 8 of smaller surface than belt 8 and gap-spaced a preselected distance therefrom, moves in an opposite direction from endless belt 8 to exert an external vortically creating force on a preselected portion of the multiple fibers sheet before that portion is returned to endless belt 18 to join the remaining portions of the multiple spaced fibers sheets from furnace 17.

In a typical inventive operation of the aforedescribed inventive apparatus multiple fibers are attenuated from a preselectively spaced heated fibers die source 3 in multiple fibers mats, each layer including spaced rows of spaced fibers of at least thirty (30) fibers per approximately two point five (2.5) centimeters with the fiber diameters advantageously being approximately three point five (3.5) microns. Selectively, a first approximately two thirds plus portion of the total fiber thickness of a formed mat are directed directly toward a first spaced longitudinally extending movable collector source which is spaced from the heated die source 3 approximately thirty (30) centimeters to be directly layered on the longitudinally extending movable collector source. At the same time, a second external vortically creating, venturi-like diverter force is exerted selectively on an approximately the remaining second portion of the fibers from the heated die fibers source, the second vertically creating, venturi-like diverter force, which, if moveable, can be moved at a different speed than drum 7 with the perimeter surface of the diverter creating force being gap-spaced from the peripheral surface of parallel drum 7 approximately zero point four eight (0.48) centimeters to thus curl a two-thirds (⅔) thickness portion of a layered mat of more porous fibers when such fibers are returned to the collector source in the form of rotatable drum 7 and subsequently, invertedly passed to mat collector source 9 with the removed inverted mat 11 (FIG. 2) having the lower two-thirds (⅔) thickness portion of greater porosity than the upper greater density and less porosity portion layers (FIG. 2).

Thus, as can be seen in FIG. 2, a novel fibrous mat of layered form is provided selectively comprising the lower approximately two thirds (⅔) plus thickness portion of porous fibers layers and the remaining, upper portion of less porous and higher density layers, the thickness of the layered fibrous mat with the fibers of both portions being approximately three point five (3.5) microns in average diameter and with the fibers of the one portion having been attenuated directly from a die source to form inverted mat, upper layers of the fibrous mat of lesser porosity than the fibers of the lower layered remaining fibers portion which have been diverted and subjected to an external, vortically creating force to form the lower layers of the inverted mat in curled form with greater porosity than the denser and less porous upper layers.

It is to be understood that the gradient density and the fiber cross-sectional size can be selectively varied by one skilled in the art in accordance with the present invention to meet particular demands of a particulate laden fluid stream to be treated.

The invention claimed is:

1. A method of forming a web of fibrous media comprising: feeding fibers in attenuated multiple fiber layers form from spaced orifice sources in a feed path toward a spaced longitudinally extending collector source to be layered on said longitudinally extending collector source in successive lower and upper fiber layers; and, exerting an external vertically creating force at a selected location on at least a portion of said multiple fibers sheet in said feed path as said portion of said multiple fiber layers approach said collector source with said portion eventually forming on said collector source having the greatest fiber porosity on said longitudinally extending collector source.

2. The method of forming a web of fibrous media of claim 1, wherein said external vortically creating force exerted on at least a portion of said multiple fiber layers is a selected, vortically creating diverting force.

3. The method of forming a web of fibrous media of claim 1, wherein said external vortically creating force exerted on at least a portion of said multiple fiber layers is a relatively static diverting force exerted in a direction spaced from said feed path of said multiple fiber layers layered on said longitudinally extending collector source.

4. The method of forming a web of fibrous media of claim 1, wherein said external vertically creating force exerted on at least a portion of said multiple fiber layers is a relatively dynamic diverting force exerted in a direction spaced from said feed path of said remaining portion of said multiple fiber layers layered on said longitudinally extending collector source.

5. The method of forming a web of fibrous media of claim 1, wherein said external vortically creating force exerted on at least a portion of said multiple fiber layers is selectively on that portion of said multiple fiber layers forming said lower fiber layers on said longitudinally extending collector source.

6. The method of forming a web of fibrous media of claim 1, wherein said attenuated multiple fibers from an orifice source are heated melt blown fibers.

7. The method of forming a web of fibrous media of claim 1, wherein said attenuated multiple fibers from an orifice source are heated glass fibers.

8. The method of forming a web of fibrous media of claim 1, wherein said orifice sources feeding includes feeding from a plurality of laterally spaced orifice row die sources.

9. The method of forming a web of fibrous media of claim 1, wherein said spaced collector source is in an endless movable form.

10. The method of forming a web of fibrous media of claim 9, said endless movable form of said spaced collector is in a form of an endless movable longitudinally elongated path.

11. The method of forming a web of fibrous media of claim 9, said endless movable form of said spaced collector is in a form of an endless rotatably movable substantially circular path.

12. The method of forming a web of fibrous media of claim 9, wherein said spaced collector source in an endless movable form follows a first directional path with said spaced external vertically creating force being in a selected differing second path.

13. The method of forming a web of fibrous media of claim 12, wherein said differing paths are at selectively differing speeds.

14. The method of forming a web of fibrous media of claim 12, wherein one of said differing paths is a relatively moveable path and the other path is a relatively static path.

15. The method of forming a web of fibrous media of claim 14, wherein chopped fibers are directed along said static path toward said first moveable path to engage with fibers thereon.

16. The method of forming a web of fibrous media of claim 1, wherein the space between said die source and said longitudinally extending collector source is in the approximate range of zero two point five (0.25) to fifteen (15) centimeters.

17. The method of forming a web of fibrous media of claim 1, wherein the space between said die source and said longitudinally extending collector source is advantageously approximately thirty (30) centimeters.

18. The method of forming a web of fibrous media of claim 1, wherein the average fiber size diameter is in the approximate range of three (3) to twenty-five (25) microns.

19. The method of forming a web of fibrous media of claim 1, wherein the advantageous fiber size diameter is approximately three point five (3.5) microns.

20. The method of forming a web of fibrous filter media of claim 1, wherein said portion of said multiple fiber layers on which said external, vortically creating force is exerted comprises approximately one third of the total fibers formed on said collector source.

21. The method of forming a web of fibrous filter media of claim 20, wherein said portion of said multiple fibers sheet on which said external vortically creating force is exerted has a porosity in the range of approximately eighty (80) to ninety-nine point (99.5) percentage.

22. A method of forming a layered web of fibrous media wherein adjacently facing layers of fibrous media are distinctly separate from each other comprising: sequentially attenuating feeding multiples of fibers in heated form from preselectively spaced heated die sources in fiber form including several spaced rows of fibers with each row advantageously having at least approximately thirty (30) fibers per approximately two point five (2.5) centimeters with the fiber diameters advantageously being approximately three point five (3.5) microns and a first approximately two-third's portion of said fibers being directed directly toward a first spaced longitudinally extending rotatable collector source spaced from said heated die source advantageously approximately thirty (30) centimeters to be layered on said longitudinally extending rotatable collector source in successive fiber layers; diverting and exerting an external second rotatable vortically creating force on an approximately one-third ($\frac{1}{3}$) second portion of said fibers, said second rotatable vertically creating diverting force being a rotatable member of smaller diameter than said first rotatable collector source, with the peripheral surface thereof being advantageously gap spaced from the peripheral surface of said first rotatable collector source approximately zero point four eight (0.48) centimeters and being rotated at a different speed than said rotating collector source to curl fibers of said diverted second one third portion of fibers when returned to said first rotating collector source thus forming fiber layers of greater porosity and lesser density than the porosity of said fiber layers formed by said first portion of fibers directed directly to said collector source with the layered fibers being inverted upon leaving said first rotating collector source.

\* \* \* \* \*

UNITED STATES PATENT AND TRADEMARK OFFICE
CERTIFICATE OF CORRECTION

PATENT NO. : 6,596,205 B1  Page 1 of 1
DATED : July 22, 2003
INVENTOR(S) : Kyung-Ju Choi It is certified that error appears in the above-identified patent and that said Letters Patent is hereby corrected as shown below:

Column 2,
Line 25, "vertically" should read -- vortically --.

Column 3,
Lines 3 and 29, "vertically" should read -- vortically --.

Column 4,
Lines 56 and 57, "vertically" should read -- vortically --.

Column 5,
Lines 2, 21 and 46, "vertically" should read -- vortically --.

Column 6,
Lines 19 and 36, "vertically" should read -- vortically --.

Column 7,
Line 4, "vertically" should read -- vortically --.

Column 8,
Line 22, "vertically" should read -- vortically --.

Signed and Sealed this

Seventh Day of October, 2003

JAMES E. ROGAN
*Director of the United States Patent and Trademark Office*